(12) United States Patent
Dandachli

(10) Patent No.: US 11,933,189 B2
(45) Date of Patent: Mar. 19, 2024

(54) METHODS AND SYSTEMS FOR A TURBO BLANKET

(71) Applicant: PTP Turbo Solutions, LLC, Austin, TX (US)

(72) Inventor: Youssef Dandachli, Austin, TX (US)

(73) Assignee: PTP Turbo Solutions, LLC, Austin, TX (US)

( * ) Notice: Subject to any disclaimer, the term of this patent is extended or adjusted under 35 U.S.C. 154(b) by 0 days.

(21) Appl. No.: 18/133,610

(22) Filed: Apr. 12, 2023

(65) Prior Publication Data
US 2023/0287803 A1 Sep. 14, 2023

Related U.S. Application Data

(60) Provisional application No. 63/319,561, filed on Mar. 14, 2022.

(51) Int. Cl.
*F01D 25/14* (2006.01)
*B60J 11/00* (2006.01)

(52) U.S. Cl.
CPC ............. *F01D 25/145* (2013.01); *B60J 11/00* (2013.01); *F05D 2220/40* (2013.01); *F05D 2240/91* (2013.01); *F05D 2300/171* (2013.01); *F05D 2300/501* (2013.01)

(58) Field of Classification Search
CPC . F01D 25/08; F01D 25/145; F02M 35/10157; F02M 35/10268; F02M 35/10334; F02B 77/11; F05D 2220/40
See application file for complete search history.

(56) References Cited

U.S. PATENT DOCUMENTS

| 11,643,947 | B2* | 5/2023 | Dandachli | F01D 25/08 |
| | | | | 428/34.5 |
| 2003/0060107 | A1* | 3/2003 | Gooliak | B32B 15/02 |
| | | | | 442/178 |
| 2006/0080958 | A1* | 4/2006 | Anthon | F01N 13/102 |
| | | | | 60/599 |
| 2016/0265383 | A1* | 9/2016 | Pujar | F02K 1/78 |
| 2019/0284983 | A1* | 9/2019 | Mullen | F16B 21/12 |

FOREIGN PATENT DOCUMENTS

GB 1220175 A * 1/1971 ............. F01D 25/08

* cited by examiner

*Primary Examiner* — Woody A Lee, Jr.
*Assistant Examiner* — Cameron A Corday
(74) *Attorney, Agent, or Firm* — Pierson IP, PLLC

(57) ABSTRACT

Systems and methods for a turbo blanket. Specifically, embodiments are related to a flexible turbo blanket with an alloy layer, insulation layer, and mesh screen layer.

7 Claims, 4 Drawing Sheets

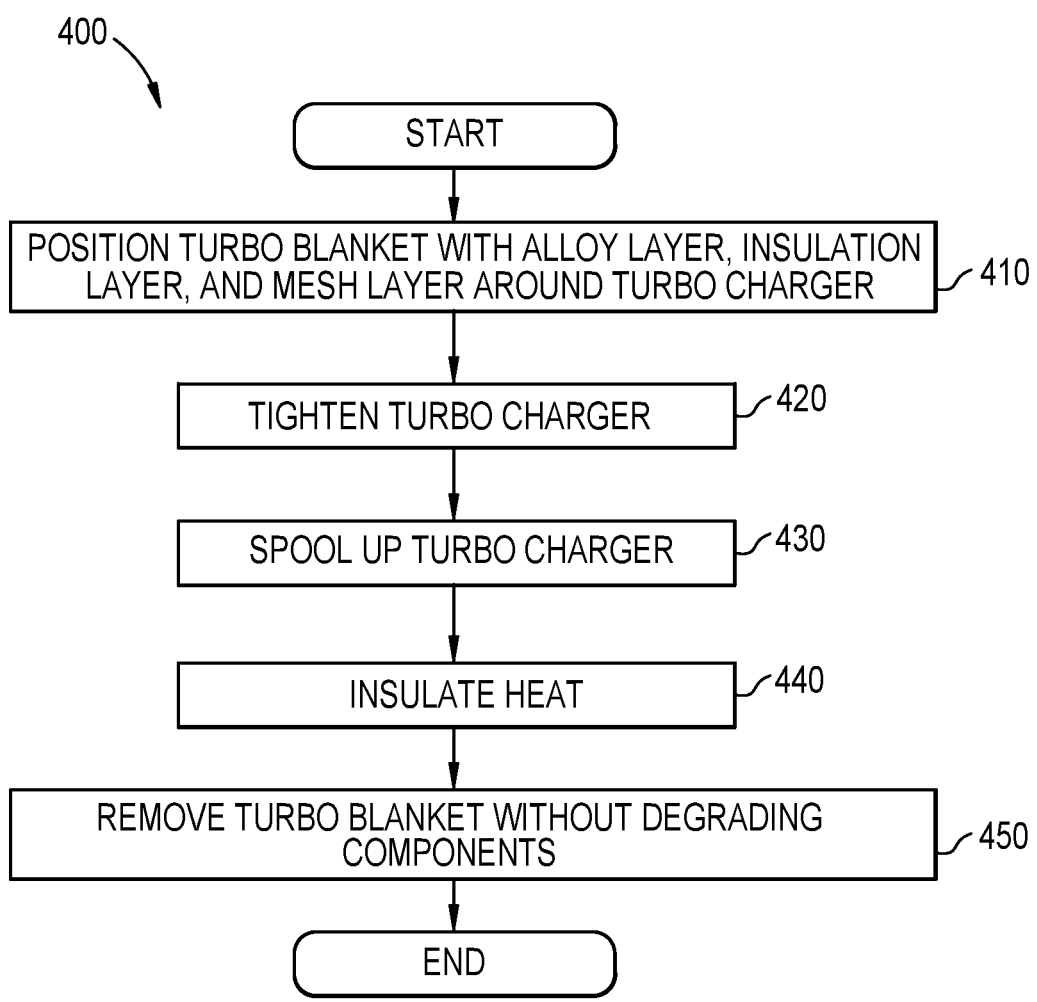

METHODS AND SYSTEMS FOR A TURBO BLANKET

BACKGROUND INFORMATION

Field of the Disclosure

Examples of the present disclosure are related to systems and methods for a turbo blanket. Specifically, embodiments are related to a flexible turbo blanket with an alloy layer, insulation layer, and mesh screen layer.

Background

A turbo blanket in vehicles are designed to protect electronic packages, sensors, wiring, engines, and other vehicle components from contacting and/or emitting substantial amount of heat. For example, a turbo blanket may be utilized to cover a turbocharger, exhaust manifold, exhaust piping, engine, catalytic converter, etc., wherein these components may generate a substantial amount of heat.

Turbo blankets are configured to elevate the performance of vehicles by providing heat protection and reducing turbo lag to a turbocharger. Conventional turbo blankets are form fitted around a component, and utilize carbon fibers to retain heat inside of the turbo. This causes the exhaust gases inside the turbocharger to become hotter, enabling the turbocharger to spool up more quickly.

However, conventional turbo blankets are formed of rigid metal cores with composite fibers to minimize heat transfer to other components within the vehicle. However, the rigid metal cores require a substantial metallic thickness, and do not allow the turbo blankets to be removed from the vehicle without stretching the composite fibers. The sizing of the metal cores for conventional turbo blankets can be less than ideal. Additionally, when conventional turbo blankets are removed from the vehicle, the fibers within the insulation and the metal of the turbo blanket become deformed, which reduces the effectiveness of the turbo blanket.

Accordingly, needs exist for more efficient and effective a flexible turbo blanket with an alloy layer, insulation layer, and mesh screen layer.

SUMMARY

Embodiments described herein are directed towards systems and methods for a flexible turbo blanket with an alloy layer, insulation layer, and mesh screen layer. Specifically, the turbo blanket may isolate the heat produced by a turbocharger, and prevents that heat from damaging, or even igniting, components surrounding the turbocharger within the engine's compartment. In embodiments, due to the turbo blanket being flexible, the turbo blanket may be wrapped around different sized turbochargers, and may dynamically change shapes. The turbo blanket may also be configured to prevent areas of localized high temperature from damaging the engine itself. By forming the turbo charger with a smaller profile alloy layer, the turbo blanket may occupy less space than a conventional turbo blanket while providing superior performance.

The alloy layer may be formed of stainless, Inconel, or any other oxidation-corrosion-resistant materials that are well suited in extreme environments subjected to pressure and heat. The alloy layer may be formed of any metal that is configured to provide insulation, is resistant to heat, and is flexible. In embodiments, the alloy layer may be configured to retain its strength over a wide temperature range, attractive for high-temperature applications where aluminum and steel would succumb to creep as a result of thermally-induced crystal vacancies. The alloy layer may be configured to be strengthened by solid solution strengthening or precipitation hardening. In embodiments, the alloy layer may have a first thickness, such as between 0.002" and 0.005."

The insulation layer may be a thermal insulator configured to reduce heat transfer between components of a vehicle. In embodiments, the insulation layer may be ceramic wool or any other high-temperature fabric that is flexible and provides a thermal barrier. In embodiments, a thickness associated with the insulation layer may be greater than that of the alloy layer. Furthermore, the insulation layer may be formed of more pliable materials than the alloy layer or the mesh screen layer.

The mesh screen layer may be an open or closed stainless steel mesh screen that is configured to be coupled to the alloy layer and retain the insulation layer in place. In embodiments, the mesh screen layer may be any metal insulation covering featuring several types of high resistance qualities. The mesh screen layer may be configured to retain its strength and its physical characteristics, even when coming in contact with incredibly high temperatures. The flexibility of the mesh screen layer allows it to fit easily around even the most irregular curves and complex shapes, and remains strong enough to resist penetration by sharp objects; it is also resistant to both vibration and chemical corrosion. In embodiments, the mesh screen layer may include a weblike pattern or construction of metal material, with evenly spaced holes. The evenly spaced holes may increase the pliability of the mesh screen, such that the mesh screen layer is more pliable than the alloy layer.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

FIG. 4 depicts a method of using a turbo blanket, according to an embodiment.

Figure 1:
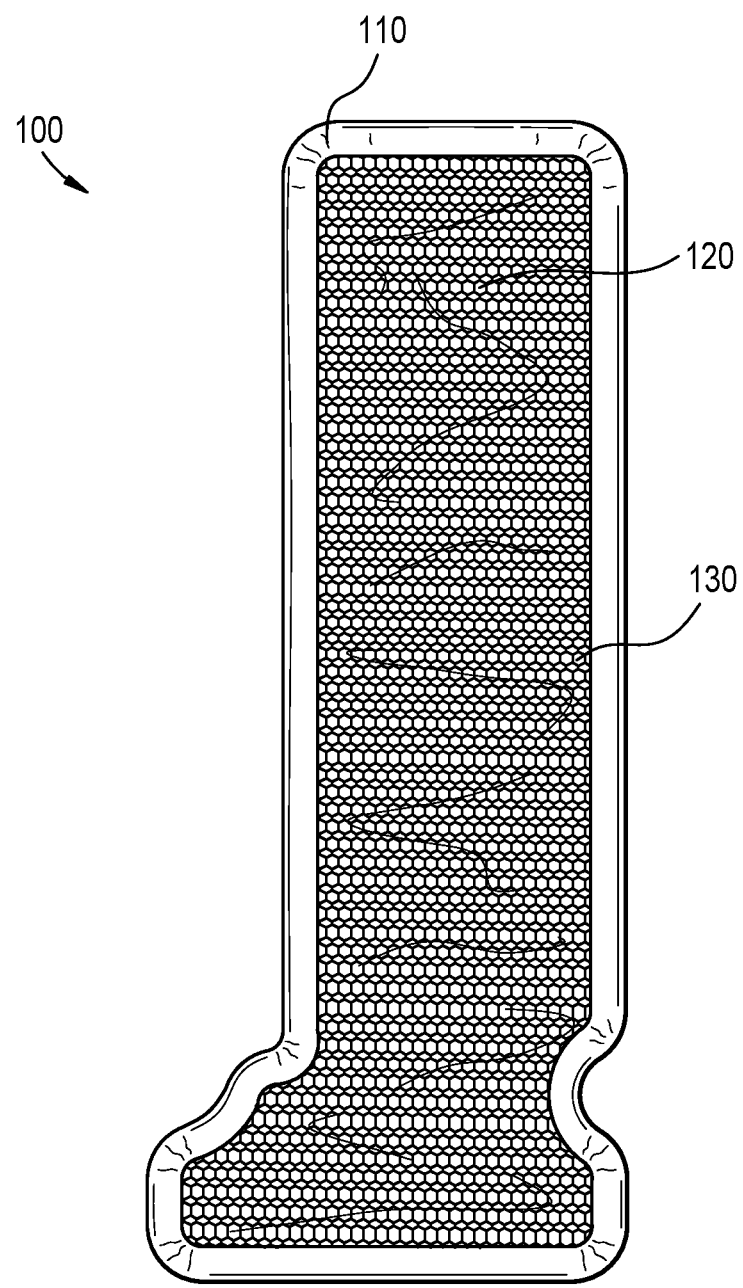
FIG. 1 depicts a front view of a turbo blanket, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure.

Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Embodiments are directed towards turbo blankets with novel construction that includes multiple, flexible layers. The turbo blankets are configured to be removable positioned within a vehicle, while providing better performance with a smaller footprint than conventional turbo blankets.

FIG. 1 depicts one embodiment of a turbo blanket 100. Turbo blanket 100 may include a first layer 110, second layer 120, and third layer 130.

First layer 110 may be an alloy layer may be formed of stainless, Inconel, or any other oxidation-corrosion-resistant materials that are well suited in extreme environments subjected to pressure and heat. In embodiments, first layer 110 may be formed of a continuous sheet of metal. First layer 110 may be configured to operate as a flexible housing that is configured to secure and form a shape of turbo blanket 100. For example, first layer 110 may be configured to wrap around a turbocharger of a vehicle, and have a spherical shape such that a first end of first layer 110 is positioned closer to or overlap a second end of first layer 110. First layer 110 may be formed of any metal that is configured to provide insulation, is resistant to heat, and is flexible. In embodiments, the alloy layer may be configured to retain its strength over a wide temperature range, attractive for high-temperature applications where aluminum and steel would succumb to creep as a result of thermally-induced crystal vacancies. First layer 110 may be configured to be strengthened by solid solution strengthening or precipitation hardening. In embodiments, first layer 110 may have a first thickness, such as between 0.002" and 0.005." The thickness of first layer 110 may be substantially smaller than that of conventional turbo blankets, which may allow first layer 110 to be flexible.

Second layer 120 may be an insulation layer may be configured to be a thermal insulator. The thermal insulation of second layer 120 may reduce heat transfer between components of a vehicle. In embodiments, second layer 120 may be ceramic wool or any other high-temperature fabric that is flexible and provides a thermal barrier. In embodiments, a thickness associated with the second layer 120 may be greater than that of the first layer 110 and third layer 130.

Third layer 130 may be a mesh screen. The mesh screen may be an open or closed stainless steel mesh screen that is configured to be coupled to the first layer 110 and retain the insulation in place. In embodiments, third layer 130 may be any metal insulation covering, featuring several types of high resistance qualities. Third layer 130 layer may be configured to retain its strength and its physical characteristics, even when coming in contact with incredibly high temperatures. The flexibility of the mesh screen allows it to fit easily around even the most irregular curves and complex shapes, and remains strong enough to resist penetration by sharp objects. The mesh screen may also be resistant to both vibration and chemical corrosion. In embodiments, the mesh screen may be configured to be positioned directly adjacent to a vehicle component that generates substantial amount of heat.

Figure 2:
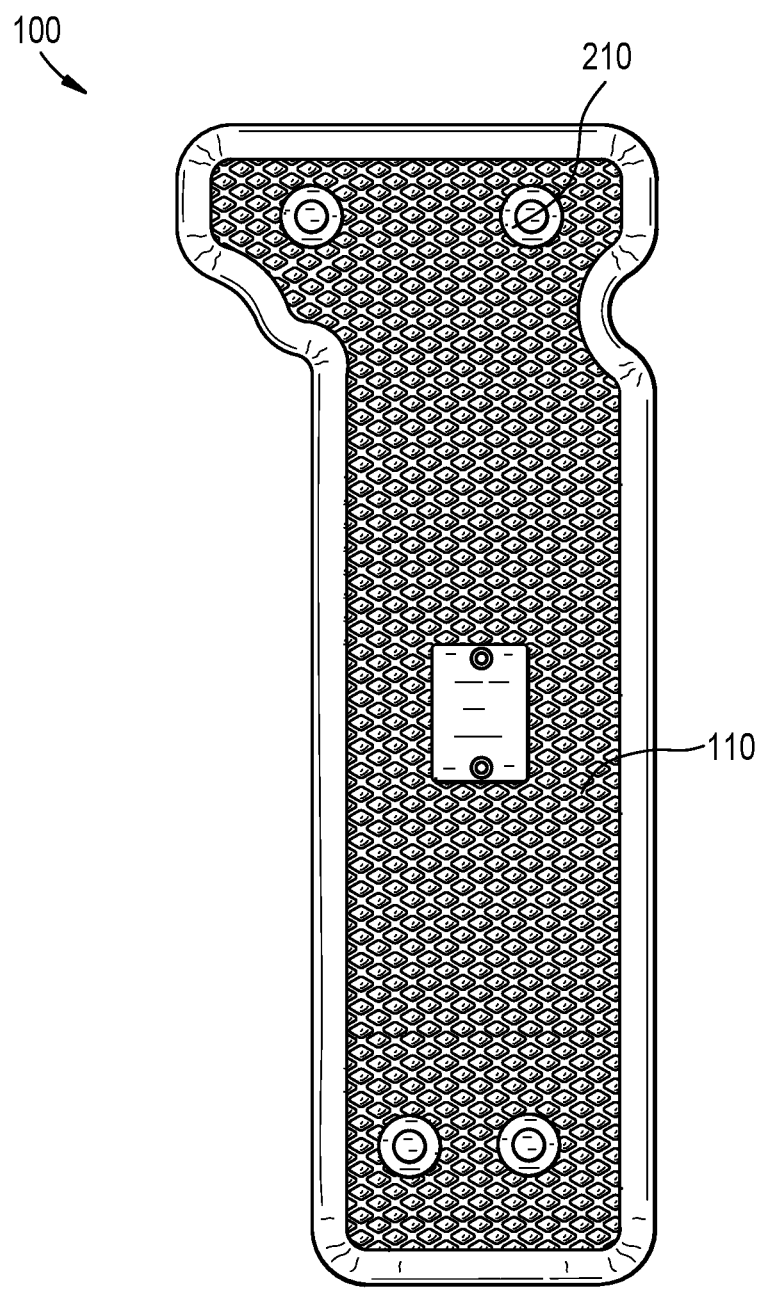
FIG. 2 depicts a rear view of a turbo blanket, according to an embodiment.

FIG. 2 depicts a rear view of turbo blanket 100, according to an embodiment. Elements depicted in FIG. 2 may be described above, and for the sake of brevity a further description of these items may be omitted.

As depicted in FIG. 2, an outer surface of turbo blanket 100 may have a plurality of rivets 210 that are configured to receive a load from a spring. Responsive to positioning a spring on the rivets, the three layers of turbo blanket 100, including the alloy layer, may wrap around the component of the vehicle.

Figure 3:
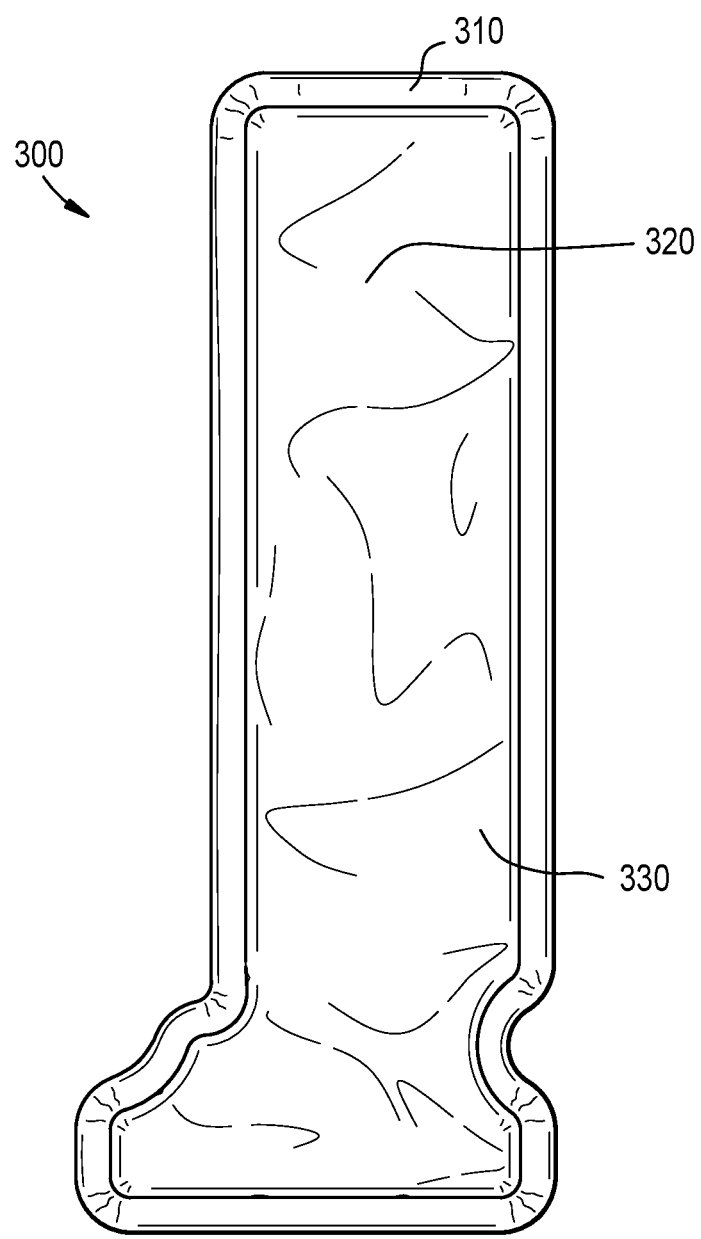
FIG. 3 depicts a turbo blanket, according to an embodiment.

FIG. 3 depicts a turbo blanket 300, according to an embodiment. Elements depicted in FIG. 3 may be described above, and for the sake of brevity a further description of these items may be omitted.

As depicted in FIG. 3, turbo blanket 300 may include a first layer 310 formed of stainless steel or Inconel, a second layer 320 formed of insulation, and a third layer 330 formed of a fine, closed stainless steel mesh screen.

FIG. 4 depicts a method for positioning a turbo blanket on a turbo charger, according to an embodiment. The operations of the method presented below are intended to be illustrative. In some embodiments, the method may be accomplished with one or more additional operations not described, and/or without one or more of the operations discussed. Additionally, the order in which the operations of the method are illustrated in FIGURES and described below is not intended to be limiting.

At operation 410, an alloy layer, insulation layer, and a mesh layer may be stretched or deformed around a turbo charger. The alloy layer may be deformed due to the relative thinness of the alloy, which may allow the alloy to be flexible.

At operation 420, springs may be positioned on rivets on the turbo blanket to secure the turbo blanket in a spherical shape.

At operation 430, the turbo charger may be spooled up, causing the turbo charger to heat up.

At operation 440, the insulation layer within the turbo blanket may operate as a thermal barrier for the heat generated by the turbo charger and retain the heat within the turbo blanket.

At operation 450, the spring may be decoupled from the rivets, and the turbo blanket may be removed from the turbo charger. Due to the flexibility of the alloy layer, insulation layer, and the mesh screen layer, the turbo blanket may retain its effectiveness even after being stretched and removed from the turbocharger.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

The flowcharts and block diagrams in the flow diagrams illustrate the architecture, functionality, and operation of possible implementations of systems, methods, and computer program products according to various embodiments of the present invention. It will also be noted that each block of the block diagrams and/or flowchart illustrations, and combinations of blocks in the block diagrams and/or flowchart illustrations, may be implemented in different orderings, combinations, etc., with additional blocks and/or blocks removed.

What is claimed is:

1. A turbo blanket comprising:
   an alloy layer formed of oxidation-resistant stainless steel, the stainless steel is a continuous sheet of metal, the alloy layer having a first thickness between 0.002 inches and 0.005 inches;
   an insulation layer, wherein a thickness of the insulation layer is larger than a thickness of the alloy layer; and
   a mesh screen layer, wherein the mesh screen layer is formed of an open stainless steel mesh screen that forms a weblike pattern with evenly spaced holes, wherein the turbo blanket is configured to be flexible and change shapes, wherein the mesh screen layer and the alloy layer are formed of the same material, wherein the mesh screen layer is configured to be positioned directly adjacent to both the insulation layer and the alloy layer, wherein a width and length of the alloy layer are larger than a width and length of the mesh screen layer.

2. The turbo blanket of claim 1, wherein the alloy layer includes a first end and a second end, wherein the first end is configured to be overlaid on the second end when the turbo blanket is positioned over a turbocharger of a vehicle.

3. The turbo blanket of claim 1, wherein the alloy layer is formed of a continuous sheet of metal.

4. The turbo blanket of claim 3, wherein the insulation layer is formed of a thermal insulator.

5. The turbo blanket of claim 4, wherein the mesh screen layer is configured to retain the insulation layer in place.

6. The turbo blanket of claim 5, wherein the alloy layer, insulation layer, and the mesh layer are configured to be stretched and deformed.

7. The turbo blanket of claim 1, further comprising:
   rivets configured to secure the turbo blanket in a spherical shape.

* * * * *